(12) United States Patent
Ikuta

(10) Patent No.: US 8,987,954 B2
(45) Date of Patent: Mar. 24, 2015

(54) ON-VEHICLE MOTOR INCLUDING DETECTOR FOR DETECTING STATE OF MOTOR

(71) Applicant: Denso Corporation, Kariya, Aichi-pref. (JP)

(72) Inventor: Hiroyuki Ikuta, Anjo (JP)

(73) Assignee: Denso Corporation, Kariya (JP)

( * ) Notice: Subject to any disclaimer, the term of this patent is extended or adjusted under 35 U.S.C. 154(b) by 330 days.

(21) Appl. No.: 13/672,875

(22) Filed: Nov. 9, 2012

(65) Prior Publication Data

US 2013/0119833 A1   May 16, 2013

(30) Foreign Application Priority Data

Nov. 10, 2011   (JP) ................................. 2011-246752

(51) Int. Cl.
*H02K 29/06* (2006.01)
*H02K 29/08* (2006.01)
*H02K 29/10* (2006.01)
*H02K 29/12* (2006.01)
*H02K 11/00* (2006.01)

(52) U.S. Cl.
CPC ........ *H02K 11/0031* (2013.01); *H02K 11/0015* (2013.01)
USPC ...................................................... 310/68 B

(58) Field of Classification Search
CPC ....................... H02K 11/0031; H02K 11/0015
USPC ....................................................... 310/68 D
See application file for complete search history.

(56) References Cited

U.S. PATENT DOCUMENTS

| 5,872,409 A * | 2/1999 | Jung ........................... 310/68 B |
| 2006/0226719 A1* | 10/2006 | Nakanishi et al. .......... 310/68 B |
| 2013/0015748 A1* | 1/2013 | Takei et al. ................. 310/68 B |
| 2013/0022302 A1* | 1/2013 | Watanabe et al. ............. 384/448 |

FOREIGN PATENT DOCUMENTS

| JP | 7-264820 | 10/1995 |
| JP | 2001-268853 | 9/2001 |
| JP | 2006-320189 | 11/2006 |
| JP | 2008-160909 | 7/2008 |

OTHER PUBLICATIONS

Office Action (2 pgs.) dated Nov. 5, 2013 issued in corresponding Japanese Application No. 2011-246752 with an at least partial English-language translation thereof (3 pgs.).

* cited by examiner

*Primary Examiner* — Terrance Kenerly
(74) *Attorney, Agent, or Firm* — Nixon & Vanderhye P.C.

(57) ABSTRACT

A motor mounted on a vehicle includes a housing; a shaft rotatably supported by the housing via a bearing; a rotor fixed to the shaft; a stator; and a detector that detects a rotational speed of the rotor. The stator includes: a stator core disposed at an outer circumferential side of the rotor to face the rotor in the radial direction along which the rotor and the stator are arranged to be adjacent each other; and a stator coil being wound around the stator core, the stator coil having a stator coil end formed at one end side of the stator coil in the axial direction. The detector is disposed between the stator coil end and the bearing that supports both ends of the shaft, and at least a part of detector is disposed to be overlapped in the radial direction with the stator coil end and the bearing.

7 Claims, 2 Drawing Sheets

ON-VEHICLE MOTOR INCLUDING DETECTOR FOR DETECTING STATE OF MOTOR

CROSS REFERENCE TO RELATED APPLICATION

This application is based on and claims the benefit of priority from earlier Japanese Patent Application No. 2011-246752 filed on Nov. 10, 2011 the description of which is incorporated herein by reference.

BACKGROUND

1. Technical Field

The present disclosure relates to a motor mounted on a vehicle and used for the vehicle.

2. Description of the Related Art

Conventionally, various types of motor have been used for a vehicle. For example, Japanese Patent Application Laid-Open Publication No. 2008-160909 discloses a motor including a detector therein. This type of motor (i.e., detector integrated motor) includes a cylindrical motor housing, a motor cover serving as a stopper for the opening of the motor housing, an output shaft of the motor rotatably supported by a bearing disposed at the motor cover, a rotor fixed to the output shaft of the motor, a stator having a circular shape disposed facing the rotor, a stator coil disposed at the stator, a resolver rotor that rotates together with the output shaft of the motor and a resolver stator disposed facing the resolver rotor. Further, the motor is provided with a resolver that detects a rotational angle of the output shaft of the motor and a shield plate disposed between the stator coil and the resolver.

According to the detector integrated motor, it is possible to reduce the leakage flux and integrate the resolver into the motor.

In recent years, a motor used for vehicles is required to have small size body, high output capability and high quality. For example, in the engine compartment, the available space for the motor to be mounted on the vehicle has become smaller. Meanwhile, the output power of the motor is required to increase. However, the detector integrated motor described in the above-described patent document includes the resolver rotor, the resolver rotor stator and the bearing being disposed to be extended in the axial direction of the motor. As a result, it is difficult to shrink the size of the motor in the axial direction.

SUMMARY

An embodiment provides a motor having a structure being shrunk within a motor body.

As a first aspect of the embodiment, a motor mounted on a vehicle includes: a housing; a shaft having first and second ends in the axial direction thereof, the first and second ends being rotatably supported by the housing via a bearing; a rotor fixed to the shaft and disposed in the housing, the rotor being capable of rotating about a rotational axis, the rotational axis being parallel to the axial direction of the shaft; a stator and a detector that detects a rotational speed of the rotor. Moreover, the stator includes: a stator core having a circular shape disposed at an outer circumference side of the rotor to face the rotor in a radial direction along which the rotor and the stator are arranged to be adjacent each other and a stator coil being wound around the stator core, the stator coil having a stator coil end formed at one end side of the stator coil in the axial direction.

The detector is disposed between the stator coil end and the bearing that supports either first or second end of the shaft, and at least a part of detector is disposed to be overlapped in the radial direction with the stator coil end and the bearing.

According to the first aspect of the embodiment, the detector is disposed between the stator coil end and the bearing that supports either first or second end of the shaft, and at least a part of detector is disposed to be overlapped in the radial direction with the stator coil end and the bearing. By this feature, space in the axial direction of the motor can be saved so that the body size of the motor can be shrunk.

As a second aspect of the embodiment, the motor is constituted by an induction motor. For controlling a synchronous motor (e.g. Interior Permanent Magnet Motor), it is necessary to obtain information about the rotational angle of the rotor, however, for controlling the induction motor, only information about the rotational speed of the rotor is required. Hence, even if the detector is disposed at an inner circumference side of the coil end formed at one end side in the axial direction of the stator coil, it is not necessary to add a noise shield to the motor in order to control the induction motor. As a result, according to the second aspect of the embodiment, the number of components used in the motor can be saved so that increasing the cost of components can be avoided. It is noted that the inventor of the present application has confirmed that no errors are detected in the rotational speed of the rotor based on whether or not the power is supplied to the stator.

As a third aspect of the embodiment, the rotor is constituted by a cage rotor having an end ring disposed at both ends of the rotor in the axial direction, and the detector is disposed at an inner circumference side of the end ring that is disposed at one end side of the rotor and at least a part of detector is disposed to be overlapped in the radial direction with the end ring.

According to the third aspect of the embodiment, the rotor is constituted by a cage rotor having an end ring disposed at both ends of the rotor in the axial direction, and the detector is disposed at an inner circumference side of the end ring that is disposed at one end side of the rotor and at least a part of detector is disposed to be overlapped in the radial direction with the end ring. Therefore, in the induction motor, length in the axial direction can be further shortened.

As a fourth aspect of the embodiment, the detector includes a detector rotor fixed to the shaft; a detector core having circular shape disposed facing an outer circumference side of the detector rotor in the radial direction; and a detector stator having a detector coil wound around the detector core. The rotor core includes a concave portion to which a part of detector stator is engaged whereby the detector stator overlaps with the rotor core in the radial direction.

According to the fourth aspect of the embodiment, since the rotor core includes a concave portion to which a part of detector stator is engaged whereby the detector stator overlaps with the rotor core in the radial direction, the length of the motor in the axial direction can be further shortened.

As a fifth aspect of an embodiment, an outer circumferential side of the detector is covered by a retainer plate made of magnetic body and the detector is supported by the housing.

According to the fifth embodiment, since electromagnetic noise entering from the outer circumferential side of the detector is reduced by the retainer plate, the electromagnetic noise influencing the detection signal can be reduced. As a result, the detection signal of the resolver can be reliably detected whereby excellent controllability of the motor can be achieved. It is noted that the inventors of the present application has confirmed that a detection error of the rotational angle can be reduced by the retainer plate when the detector detects the rotational angle of the rotor.

As a sixth aspect of the embodiment, the retainer plate is disposed to cover the outer circumferential side of the detector and an end surface in the axial direction of the rotor.

According to the sixth aspect of the embodiment, since electromagnetic noise entering from the axial direction of the detector can be reduced by the retainer plate, controllability of the motor can be further enhanced.

DETAILED DESCRIPTION OF THE PREFERRED EMBODIMENTS

With reference to the drawings, hereinafter is described a rotary electric machine according to the present disclosure.

First Embodiment

Figure 1:
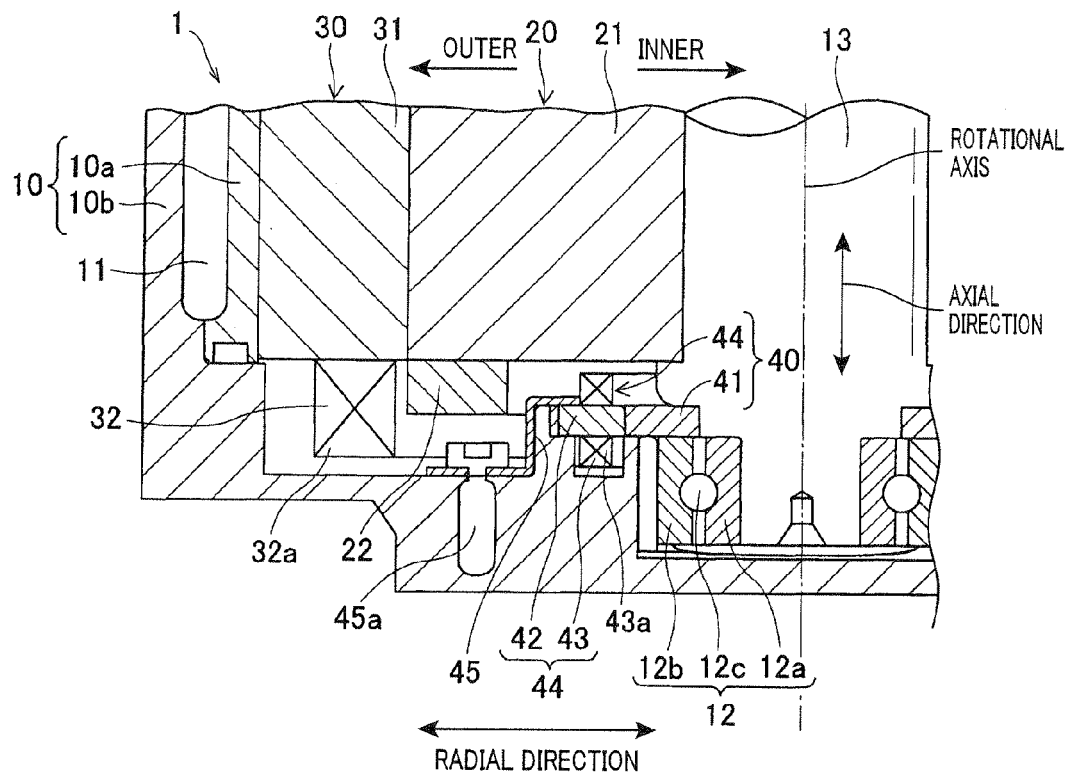
FIG. 1 is a cross-sectional view in the axial direction of a motor according to the first embodiment of the present disclosure, showing an enlarged major portion of the motor.
Figure 2:
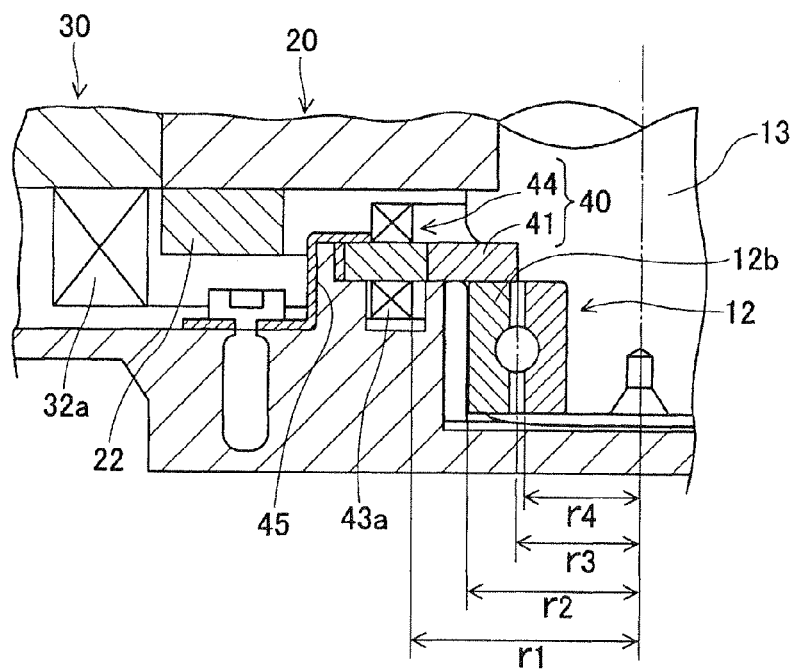
FIG. 2 is a cross-sectional view in the axial direction of the motor showing the major portion being further enlarged from that of FIG. 1.

FIG. 1 is a cross-sectional view in the axial direction of a motor according to the first embodiment showing an enlarged major portion of the motor. FIG. 2 is a cross-sectional view in the axial direction showing the major portion being further enlarged from that of FIG. 1.

The motor 1 according to the first embodiment is an induction motor mounted on a vehicle. As shown in FIG. 1, the motor 1 includes a housing 10 made of aluminum, a shaft 13, a rotor 20, a stator 30 and a resolver 40. The rotor 20 is capable of rotating about a rotational axis in the shaft 13 being extended in the axial direction (i.e., longitudinal direction of the shaft 13). The shaft 13, the rotor 20 and the stator 30 are disposed to be adjacent in the radial direction. The resolver 40 serves as a detector that detects the rotational speed of the rotor 20.

Specifically, the shaft 13 is supported by the housing 10 such that both ends (i.e., first and second ends) of the shaft 13 in the axial direction thereof is rotatably supported by the housing 10 via a pair of bearings (only a rear-bearing 12 is shown in FIG. 1). The rotor 20 is disposed in the housing 10 and is fixed with the shaft 13. The stator 30 includes a stator core 31 having a circular shape disposed at an outer circumferential side of the rotor 20 to face the rotor 20 in the radial direction, a stator coil 32 being wound around the stator core 31.

The housing 10 is constituted by a front housing 10a and a rear housing 10b. The front housing 10a has a bottomed cylindrical shape where one end side in the axial direction (shown in lower side of FIG. 1) is opened. Similarly, the rear housing 10b has a bottomed cylindrical shape where the other end side in the axial direction (shown in upper side of FIG. 1) is opened. This housing 10 is assembled such that a cylindrical portion of the rear housing 10b is engaged with the front housing 10a in the axial direction and the front housing 10a and the rear housing 10b are fixed to each other by bolts (not shown) at a plurality of locations in a circumferential direction (i.e. a direction along which the rotor 20 rotates). Specifically, the cylindrical portion of the rear housing 10b is engaged with an outer circumferential side of the cylindrical portion in the front housing 10a when the opening side of the front housing 10a and the opening side of the rear housing 10b face each other, then the front housing 10a and the rear housing 10b are fixed to each other by the bolts.

A passage 11 through which coolant for cooling the housing 10 flows is disposed between an outer-circumferential-surface of the cylindrical portion of the front housing 10a and an inner-circumferential-surface of the cylindrical portion of the rear housing 10b. The passage 11 is formed to be curved (i.e., in the circumferential direction) with a predetermined width.

In the rear housing 10b, a rear bearing 12 having an inner rim 12a, an outer rim 12b and a plurality of balls 12c capable of moving in a groove formed between the inner rim 12a and an outer rim 12b, and being extended to the circumferential direction are attached at a center bottom portion of the rear housing 10b. Also, a front bearing (not shown) constituted similarly to that of the rear housing 12 is attached at a center bottom portion of the front housing.

Both ends of the shaft 13 are inserted to the inner rim of the front bearing and the inner rim 12a of the rear bearing 12 to be fixed thereto. As a result, both ends of the shaft 13 are rotatably supported in the housing 10 via the rear bearing 12 and the front bearing.

The rotor 20 that rotates together with the shaft 13 is fixed to the outer circumference of the shaft 13. The rotor 20 includes a rotor core 21 in which a plurality of steel plates are laminated in the axial direction. Further, the rotor 20 includes an end ring 22 which is casted in aluminum alloy at a groove of the rotator core 21 so as to constitute a cage rotor. In the outer circumferential side of the rotor 20, a stator 30 having a stator core 31 disposed facing the radial direction of the motor and a stator coil 32 wound around the stator core 31 are fixed to an inner wall surface of the housing 10. A given air gap is formed between the outer-circumferential-surface of the rotor 20 and the inner-circumferential-surface of the stator core 31.

The resolver 40 that detects a rotational speed of the rotor 20 includes a resolver rotor (detector rotor) 41 fixed to one end of the shaft 13, a resolver core (detector core) 42 having circular shape disposed facing the outer circumferential side of the resolver rotor 41 in the radial direction of the motor and a resolver stator 44 having a resolver coil (detector coil) 43 wound around the resolver core 42.

This resolver 40 is arranged such that a coil end 43a (i.e., detector coil end) formed at one end side of the resolver coil 43 in the axial direction (i.e., one axial end) is disposed between a coil end 32a (i.e., stator coil end) formed at one axial end of the stator coil 32 and the rear bearing 12 that supports one end of the shaft 13 in the axial direction, and overlapped with the coil end 32a and the rear bearing 12 in the radial direction of the motor. Moreover, the resolver 40 is arranged such that the coil end 43a formed at other axial end of the resolver coil 43 locates at an inner circumferential side of the end ring 22 at the one end side in the axial direction, and overlapped with the end ring 22 in the radial direction of the motor.

As shown in FIG. 2, assuming the radius of the inner diameter of coil end 43a included in the resolver coil 43 is r1, and the radius of the outer diameter of the outer rim 12b included in the rear bearing 12 is r2, a relationship r1>r2 is determined. As a result, the resolver 40 is disposed at the above-described given position so as to avoid the resolver 40 interfering with the rear bearing 12. Assuming the radius of the inner diameter of the outer rim 12b included in the rear bearing 12 is r3 and the radius of the inner diameter of the resolver rotor 41 is r4, a relationship r3>r4 is determined. As a result, the rear bearing 12 can be rotatable.

Regarding the resolver 40, the resolver rotor 41 is fixed to the outer circumferential side of the shaft 13. The resolver core 42 is fixed to the inner wall surface of the housing 10 by a mounting bolt 45a via a retainer plate 45 which is made of ferrous magnetic metal (magnetic body). In this case, the retainer plate 45 is disposed to cover the outer circumferential side of the resolver core 42. Therefore, since electromagnetic noise entering from the outer circumferential side of the resolver 40 is reduced, influence of the noise to a detection signal of the resolver 40 is reduced as well. Hence, the detection signal of the resolver 40 can be reliably detected. As a result, controllability of the induction motor can be enhanced. The resolver 40 verifies the resolver coil 43 that represents a change in the magnetic flux at the resolver rotor 41 rotating together with the shaft 13, thereby detecting the rotational speed of the shaft 13 (rotor 20).

It is noted that a pulley (not shown) that transmits rotational force of the shaft 13 via a belt is fixed to the other end side in the axial direction of the shaft 13.

In the above-described motor 1 according to the first embodiment, the resolver 40 is arranged such that a coil end 43a formed at one end side of the resolver coil 43 in the axial direction is disposed between a coil end 32a formed at one end side of the stator coil 32 in the axial direction and the rear bearing 12 that supports one end of the shaft 13 in the axial direction, and overlapped with the coil end 32a and the rear bearing 12 in the radial direction of the motor. This configuration makes it possible to reduce a space in the axial direction of the motor 1 so that the motor can be miniaturized.

Moreover, the motor 1 according to the first embodiment is an induction motor so that only rotational speed of the rotor 20 is required to control the induction motor. Hence, even when the resolver 40 is disposed in the inner circumferential side of the coil end 32a that is formed at the one end side of the stator coil 32 in the axial direction, the induction motor can be controlled without using a noise-shield to avoid the electromagnetic noise. As a result, the number of components can be cut down so that an increase in the material-cost can be avoided.

Especially, according to the first embodiment, the resolver 40 is arranged such that the coil end 43a formed at the other end side of the resolver coil 43 in the axial direction of the motor locates at an inner circumferential side of the end ring 22 at the one end side in the axial direction, and overlapped with the end ring 22 in the radial direction of the motor. Therefore, length in the axial direction of the induction motor can be reduced.

Further, in the first embodiment, the outer circumferential side of the resolver 40 is covered by the retainer plate 45 which is made of a magnetic body and the resolver 40 is fixed to the inner wall of the housing 10. Therefore, since electromagnetic noise entering from the outer circumferential side of the resolver 40 is reduced, a detection signal of the resolver 40 can be reliably detected. As a result, controllability of the induction motor can be enhanced.

Second Embodiment

Figure 3:
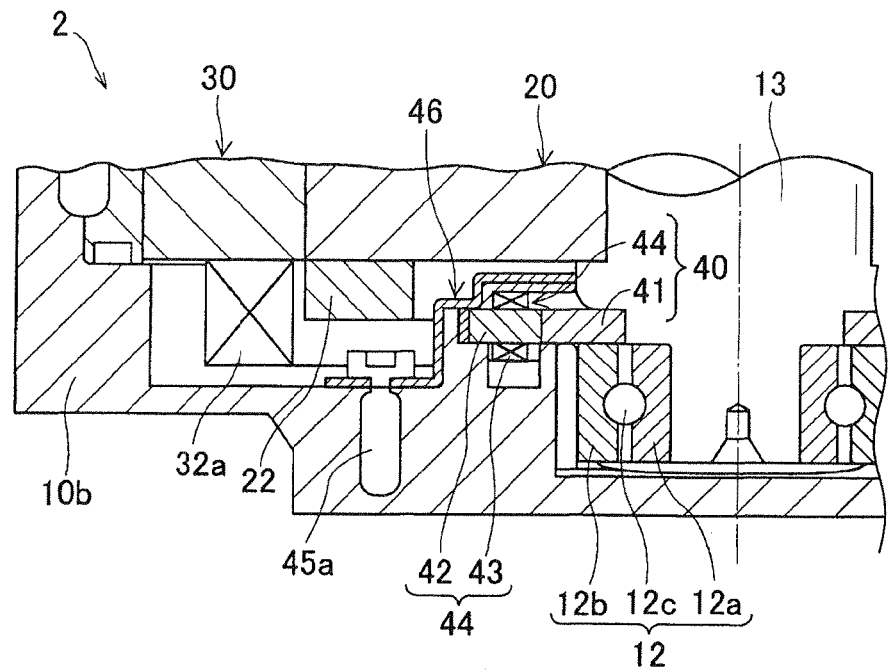
FIG. 3 is a cross-sectional view in the axial direction of a motor according to the second embodiment, showing an enlarged major portion of the motor.

FIG. 3 is a cross-sectional view in the axial direction of the motor according to the second embodiment, showing an enlarged major portion of the motor. The motor 2 according to the second embodiment is an induction motor of which overall configuration is similar to that of the first embodiment, however, only a configuration of the retainer plate 46 differs from the first embodiment. Therefore, in the second embodiment, components identical with or similar to those in the first embodiment are given the same reference numerals and the explanation thereof is omitted. Hereinafter, configurations differing from the first embodiment are described.

As similar to the first embodiment, the retainer plate 46 according to the second embodiment is made of iron type metal (magnetic body) and fixed to the inner wall surface of the rear housing 10b. However, a configuration in which the retainer plate 46 is disposed to cover the outer circumferential side of the resolver 40 and an end surface of the rotor 20 side in the axial direction is different from that of the first embodiment.

Therefore, in the motor 2 according to the second embodiment, electromagnetic noise entering from the outer circumferential side of the resolver 40 and electromagnetic noise entering from the axial direction of the motor 2 can be reduced by the retainer plate 46 whereby the controllability of the induction motor can be enhanced.

Third Embodiment

Figure 4:
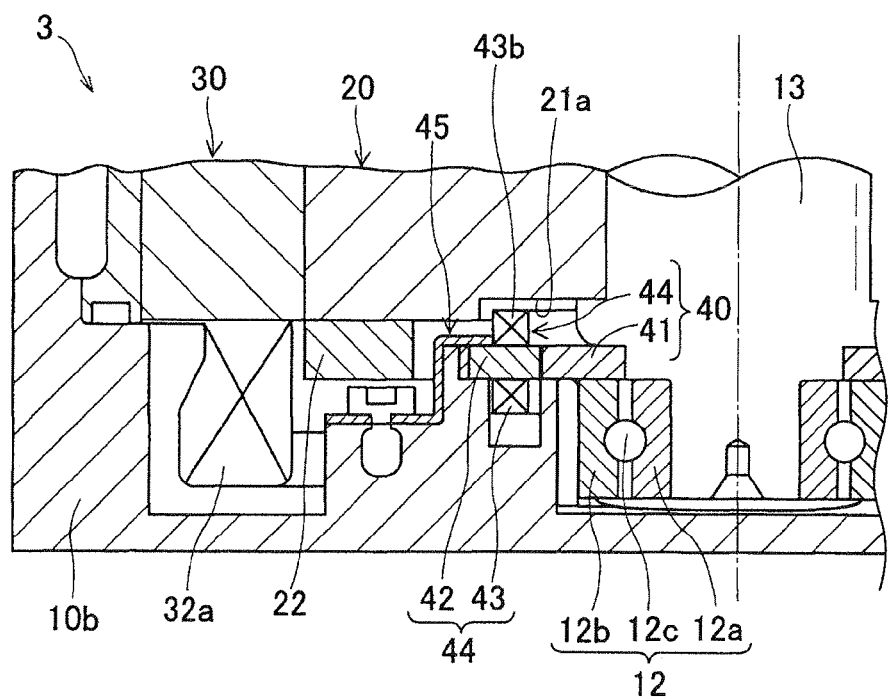
FIG. 4 is a cross-sectional view in the axial direction of a motor according to the third embodiment, showing an enlarged major portion of the motor.

FIG. 4 is a cross-sectional view in the axial direction of a motor according to the third embodiment, showing an enlarged major portion of the motor. The motor 3 according to the third embodiment is an induction motor of which overall configuration is similar to that of the first embodiment. Also, the resolver 40 is similar to that of the first embodiment, however, the resolver 40 is arranged differently from that of the first embodiment. Accordingly, in the third embodiment, the components identical with or similar to those in the first embodiment are given the same reference numerals and the explanation thereof is omitted. Hereinafter, configurations differing from the first embodiment are described.

In the third embodiment, a concave portion 21a is disposed at the inner circumferential side of one end surface in the axial direction of the rotor core 21. The concave portion 21a is extended to the circumferential direction with a predetermined depth and width so as to form a ring shape. The resolver stator 44 is disposed at a location where a part of the coil end 43b at the other end side in the axial direction of the resolver coil 43 engages to the concave portion 21a so as to overlap with the rotor core 21 in the radial direction.

Therefore, in the motor 3 according to the third embodiment, length in the axial direction of the motor 3 can be shortened compared to the one of the first embodiment.

Other Embodiments

The present disclosure is not limited to the above-describe embodiments, however, various modifications can be made without departing from the spirit and the scope thereof.

For example, regarding the resolver 40 according to the above-described embodiments, which is used for detecting a rotational speed of the rotor 20, appropriate resolver can be selected from various types of resolvers to detect rotational angle and the rotational position of the rotor 20, whereby information necessary to control various types of motors can be obtained.

Moreover, in the above-described embodiments, the present disclosure is adapted to an induction motor. However, the present disclosure can be adapted to a synchronous motor other than an induction motor, or a DC motor and the like.

What is claimed is:

1. A motor mounted on a vehicle comprising:
a housing;
a shaft having first and second ends in an axial direction thereof, the first and second ends being rotatably supported by the housing via a bearing;
a rotor fixed to the shaft and disposed in the housing, the rotor being capable of rotating about a rotational axis, the rotational axis being parallel to the axial direction of the shaft;
a stator that includes:
a stator core having a circular shape disposed at an outer circumferential side of the rotor to face the rotor in a radial direction along which the rotor and the stator are arranged to be adjacent each other and
a stator coil being wound around the stator core, the stator coil having a stator coil end formed at one end side of the stator coil in the axial direction; and
a detector that detects a rotational speed of the rotor, wherein the detector is disposed between the stator coil end and the bearing that supports either first or second end of the shaft, and at least a part of detector is disposed to be overlapped in the radial direction with the stator coil end and the bearing,
the detector includes a detector rotor fixed to the shaft; a detector core having circular shape disposed facing an outer circumferential side of the detector rotor in the radial direction; and a detector stator having a detector coil wound around the detector core, and a rotor core of the rotor includes a concave portion to which a part of detector stator is engaged whereby the detector stator overlaps with the rotor core in the radial direction, the rotor core being constituted by a plurality of steel plates being laminated in the axial direction, and a concave portion being disposed at an inner circumference side of one end surface in the axial direction of the rotor core and extending to a circumference direction with a predetermined depth and width so as to form a ring shape.

2. The motor according to claim 1, wherein the motor is constituted by an induction motor.

3. The motor according claim 2, wherein
the rotor is constituted by a cage rotor having an end ring disposed at both ends of the rotor in the axial direction, and the detector is disposed at an inner circumferential side of the end ring that is disposed at one end side of the rotor and at least a part of detector is disposed to be overlapped in the radial direction with the end ring.

4. The motor according to claim 2, wherein
an outer circumferential side of the detector is covered by a retainer plate made of magnetic body and the detector is supported by the housing.

5. The motor according to claim 3, wherein
an outer circumferential side of the detector is covered by a retainer plate made of magnetic body and the detector is supported by the housing.

6. The motor according to claim 1, wherein
an outer circumferential side of the detector is covered by a retainer plate made of magnetic body and the detector is supported by the housing.

7. The motor according to claim 6, wherein
the retainer plate is disposed to cover the outer circumferential side of the detector and an end surface in the axial direction of the rotor.

* * * * *